United States Patent [19]

Lee

[11] Patent Number: 5,808,701
[45] Date of Patent: Sep. 15, 1998

[54] CIRCUIT FOR AUTOMATICALLY COMPENSATING DELAY DIFFERENCE BETWEEN LUMINANCE SIGNAL AND COLOR SIGNAL

[75] Inventor: Tae-Sung Lee, Suwon, Rep. of Korea

[73] Assignee: SamSung Electronics Co., Ltd., Kyungki-do, Rep. of Korea

[21] Appl. No.: 781,192

[22] Filed: Jan. 10, 1997

[30] Foreign Application Priority Data

Jan. 11, 1996 [KR] Rep. of Korea ................... 436/1996

[51] Int. Cl.⁶ ........................... H04N 9/77; H04N 9/78
[52] U.S. Cl. ..................... 348/712; 348/663; 348/914
[58] Field of Search .................... 348/914, 571, 348/659, 660, 663–670, 708, 710, 712, 713, 234; H04N 9/77, 9/78

[56] References Cited

U.S. PATENT DOCUMENTS

| 4,982,179 | 1/1991 | Ogawa et al. | 340/703 |
| 5,095,364 | 3/1992 | Asaida et al. | 358/41 |
| 5,355,179 | 10/1994 | Ciardi et al. | 348/654 |
| 5,657,387 | 8/1997 | Mogi et al. | 380/20 |

*Primary Examiner*—Mark R. Powell
*Assistant Examiner*—John W. Miller

*Attorney, Agent, or Firm*—Sughrue, Mion, Zinn, Macpeak & Seas, PLLC

[57] ABSTRACT

A video signal processing system includes a circuit for detecting the delay between a luminance signal and a color signal in a video signal, and for automatically compensating for the delay. The circuit includes a Y/C separator for separating a composite video signal into the luminance signal and the color signal, and a color difference and synchronous signals separator for separating the luminance and color signals into synchronous and color difference signals. A delay circuit receives and delays the luminance signal based on a delay control signal, and outputs the delayed luminance signal to a video signal processor, which also receives the color difference signals directly from the color difference and synchronous signals separator. The delay control signal is generated by a delay correction signal generator, which is responsive to the synchronous signals generated by the color difference and synchronous signals separator, and outputs of the video signal processor, including a delayed luminance signal and color difference signals. The delay correction signal generator 22 reciprocally compares the luminance signal with the color signals in accordance with the separated synchronous signals, and outputs the delay control signal, corresponding to the detected amount of delay, to the delay circuit, in order to delay the luminance signal, and thereby compensate for the delay between the color signals and luminance signal.

8 Claims, 2 Drawing Sheets

CIRCUIT FOR AUTOMATICALLY COMPENSATING DELAY DIFFERENCE BETWEEN LUMINANCE SIGNAL AND COLOR SIGNAL

BACKGROUND OF THE INVENTION

The present invention relates to a video signal processing system. More particularly, the present invention is directed to a video signal processing system which separates a composite video signal into a luminance signal and color signal, and automatically compensates for delay between the two signals.

Conventionally, a video signal processing system (e.g., a color television, a video cassette tape recorder, or a video color printer) processes a video signal by separating a composite video signal into a luminance signal and a color signal. However, inevitably, a delay between the luminance signal and the color signal in the video signal processing system results. Typically, the delay occurs when processing the color signal, rather than processing the luminance signal. Accordingly, the processing of the color signal is generally more sophisticated than the processing of the luminance signal in attempts to compensate for this delay.

The delay between the luminance signal and the color signal causes deterioration of the image quality. Therefore, it is necessary to correct the delay between these two signals. A common, widespread, method for directly adjusting the delay has been to compensate for the delay between the luminance signal and the color signal at the factory; that is, prior to shipping the video processing system as a product. In other words, the delay is compensated for in a fixed manner at the design stage, and irrespective of the specific application (e.g., type of broadcasting system) in which the product is used.

However, for several reasons, it is troublesome and not necessarily effective to use the above method for directly and passively adjusting and compensating for the delay difference. For instance, the difference in delay between an RF signal and a video signal, as well as the delay difference between the luminance signal and the color signal can depend on the broadcasting system from which a television receives a broadcasting signal. There are various broadcasting systems, such as NTSC (National Television System Committee) system, PAL (Pulse Alternation by Line) system, and SECSM (Sequential Events Control System), and with each, there exists a problem in that the amount of delay is different and needs to be corrected differently depending on the type of broadcasting system. Also, because the receiver of the television is passively adjusted upon being produced, the efficiency of producing and shipping products is considerably lowered, thereby raising the cost of the total production.

SUMMARY OF THE INVENTION

It is therefore an object of the present invention to provide a circuit for detecting the delay between a luminance signal and a color signal in a video signal processing system, and for automatically compensating for the delay therebetween in accordance with the amount of delay detected.

It is another object of the present invention to provide a circuit for automatically compensating for the delay between the luminance signal and the color signal in a video signal processing system, the luminance and color signals being generated according to the differences in the paths each signal traverses.

It is a further object of the present invention to provide a circuit for detecting the delay between the luminance signal and the color signal processed as signals.

To achieve the above and other objects of the present invention, there is provided a video processing system including a circuit for automatically compensating for delay between a luminance signal and a color signal extracted from a composite video signal. The system includes a Y/C separator, coupled to receive the composite video signal, and operative to separate the composite video signal into a luminance signal and color signal, a color difference and synchronous signals separator, coupled to outputs of the Y/C separator to receive the luminance signal and color signal, the color difference and synchronous signals separator separating the color signals into color difference signals and producing synchronous signals, a delay circuit, coupled to an output of the color difference and synchronous signals separator to receive the luminance signal and being responsive to a delay control signal, the delay circuit being operative to delay the luminance signal based on the delay control signal, and outputting the delayed luminance signal, a video signal processor, coupled to an output of the color difference and synchronous signals separator to receive the color difference signals and to an output of the delay circuit to receive the delayed luminance signal, the video signal processor being operative to process the delayed luminance signal and color difference signals, and a delay correction signal generator, coupled to an output of the color difference synchronous signals separator to receive the synchronous signals, and to an output of the video signal processor to receive luminance signal and color difference signals processed by the video signal processor, the delay correction signal generator being operative to compare the luminance signal with the color difference signals and to detect a delay therebetween, based on the synchronous signals, and to generate the delay control signal based on the detected delay.

Further, the above and other objects of the present invention are achieved by providing a circuit for automatically compensating for delay between a luminance signal and a color signal extracted from a composite video signal in a video signal processing system. The circuit includes a timing clock generator, responsive to synchronous signals, and being operative to generate a timing signal based on the synchronous signals, a luminance and color signals delay detector, responsive to a luminance signal and at least one color signal and to the timing signal, the luminance and color signals delay detector being operative to detect the delay between the luminance and at least one of the color signals, and outputting a detected delay signal, a controller, coupled to the luminance and color signals delay detector to receive the detected delay signal, and being operative to generate a delay control signal, and a delay circuit, responsive to the delay control signal, for delaying the luminance signal based on the delay control signal, and outputting the delayed luminance signal, wherein the delay between the luminance signal and color signals is minimized.

Even further, the present invention provides for a method of automatically compensating for delay between a luminance signal and a color signal extracted from a composite video signal in a video processing system. The method includes the steps of: separating a composite video signal into a luminance signal and color signal, separating the color signals into color difference signals and producing synchronous signals, delaying the luminance signal based on a delay control signal, and outputting a delayed luminance signal that has been delayed to correspond with the color signals, processing the delayed luminance signal and color difference signals, and comparing the luminance signal with the color difference signals and detecting a delay therebetween, based on the synchronous signals, and generating the delay control signal based on the detected delay.

BRIEF DESCRIPTION OF THE DRAWINGS

A more complete appreciation of the present invention, and many of the attendant advantages thereof, will become readily apparent in view of the following detailed description of the present invention considered in conjunction with the accompanying drawings, in which like reference symbols indicate the same or similar components, wherein.

DETAILED DESCRIPTION OF PREFERRED EMBODIMENTS OF THE PRESENT INVENTION

In the following description, specific details, such as components and frequencies of the circuit elements, are set forth to provide a more thorough and complete understanding of the preferred embodiments of the present invention. It will be apparent, however, to one skilled in the art that the present invention may be practiced without these specific details. Furthermore, a detailed description of known functions and circuit constructions have been omitted to avoid unnecessarily obscuring the subject matter of the present invention.

Figure 1:
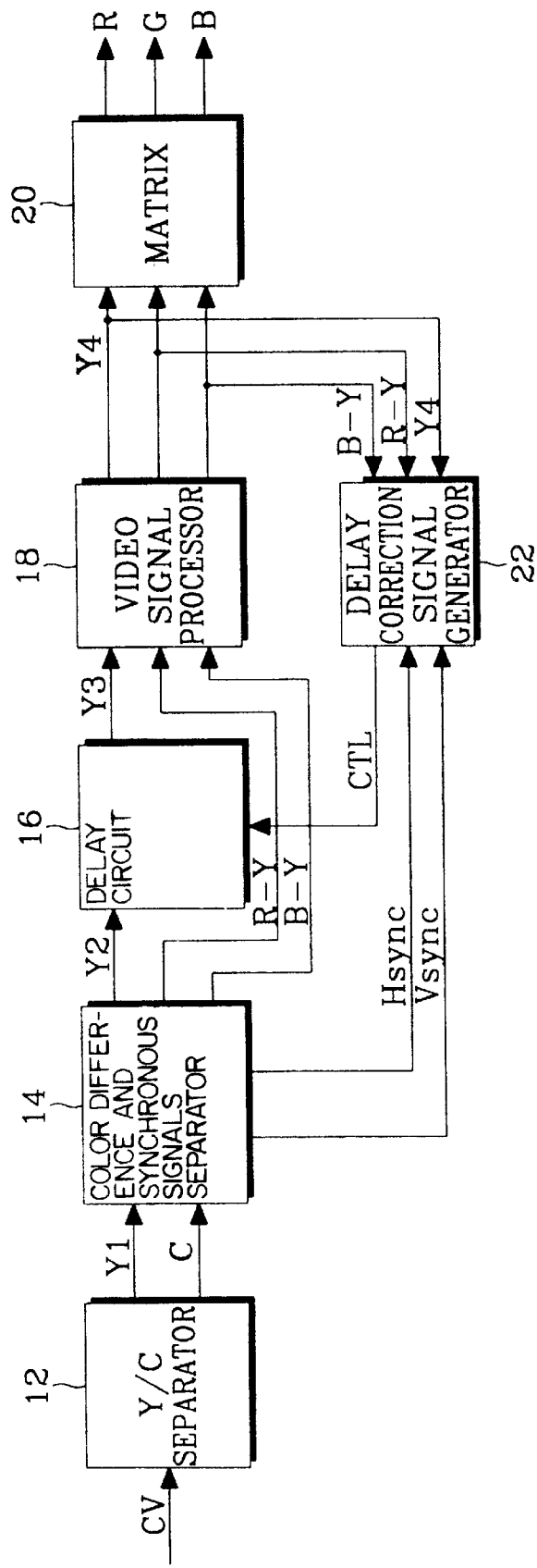
FIG. 1 illustrates a block diagram of a circuit for automatically compensating for delay between a luminance signal and a color signal according to a preferred embodiment of the present invention.

FIG. 1 illustrates a block diagram of a circuit for automatically compensating for delay between a luminance signal and a color signal according to the present invention. As seen in FIG. 1, luminance and color signals having delay difference from each other are input to the circuit. The circuit detects the delay difference by comparing the luminance and color signals with each other, and controls the amount of delay of the luminance signal in correspondence with the detected delay, so as to minimize the amount of delay between the luminance signal and the color signal.

Figure 2:
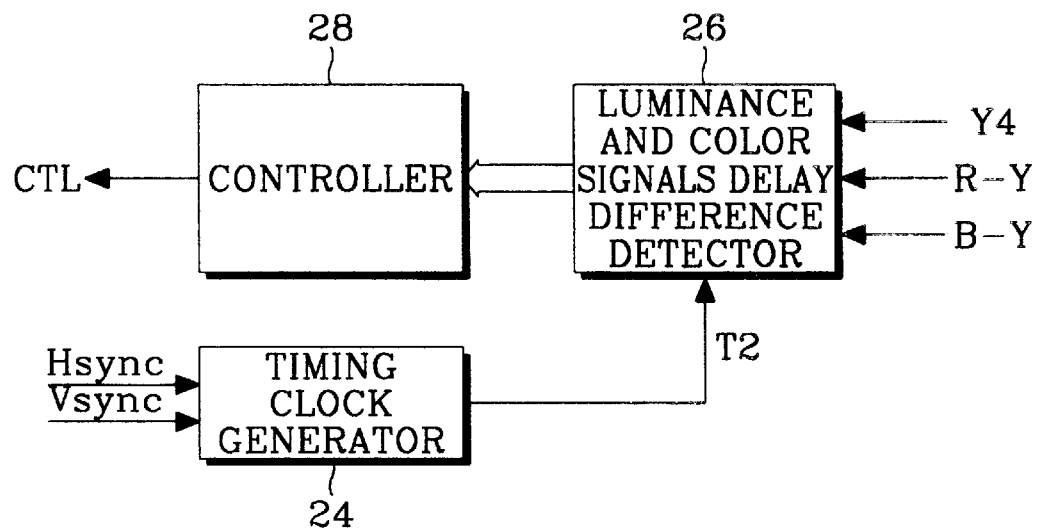
FIG. 2 illustrates a block diagram of a delay correction signal generator of FIG. 1, according to a preferred embodiment of the present invention.

FIG. 2 illustrates a block diagram of a delay correction signal generator as shown in FIG. 1, according to a preferred embodiment of the present invention.

FIGS. 3(A)–(D) illustrate waveforms corresponding to the operation of the circuits shown in FIGS. 1 and 2, wherein FIG. 3(A) depicts a video signal inputted as a reference signal to a vertical retrace line interval, FIG. 3(B) depicts a luminance signal Y separated from the video signal shown in FIG. 3(A), FIG. 3(C) depicts a normal color signal in the case of separating and demodulating the color signal of the video signal shown in FIG. 3(A), and FIG. 3(D) depicts the color signal delayed after demodulation.

Figure 3:
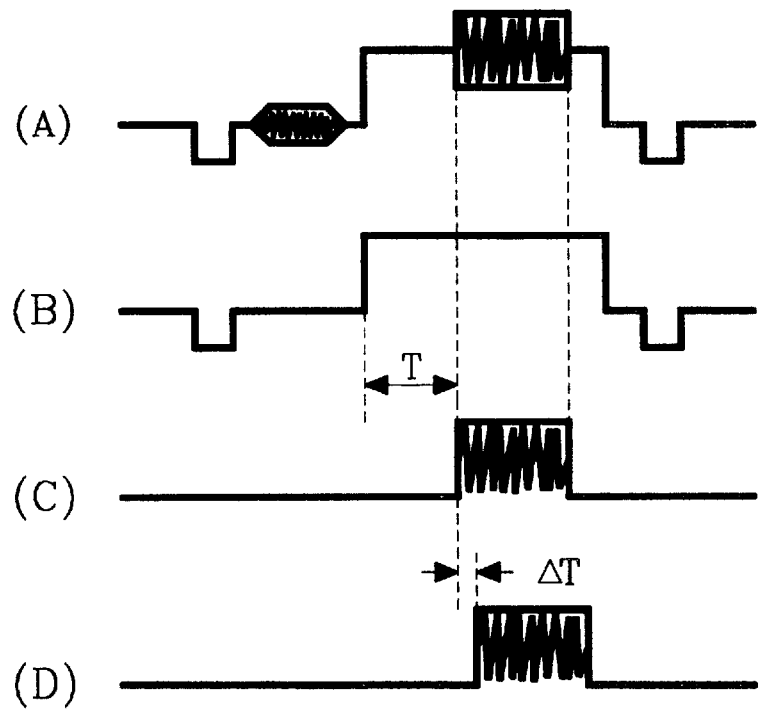
FIGS. 3(A)–(D) illustrate waveforms corresponding to the operation of the circuits of FIGS. 1 and 2.

Operation of the circuits illustrated in FIGS. 1 and 2 constructed according to the principle teachings of the present invention will be given hereinafter with reference to FIG. 3.

Referring to FIG. 1, a composite video signal CV, which is input as a reference signal to the vertical retrace line interval, is input to a Y/C separator 12. The Y/C separator separates the composite video signal CV into a luminance signal Y1 and color signal C, each illustrated in FIG. 3(B) and FIG. 3(C), respectively. The luminance signal Y1 and color signal C are then supplied to a color difference and synchronous signals separator 14 from the Y/C separator 12. The color difference and synchronous signals separator 14 functions to separate the color signal C into color difference signals R-Y and B-Y, and to generate synchronous signals Hsync and Vsync. The color difference signals R-Y and B-Y are supplied to a video signal processor 18, while the synchronous signals Hsync and Vsync are supplied to a delay correction signal generator 22. At the same time, the luminance signal Y1 is supplied to a delay circuit 16, which produces luminance signal Y2 as explained below. The time difference T between the luminance signal Y1 (as shown by FIG. 3(B)) and the color signal C (as shown by FIG. 3(C)) depends on processing times of the Y/C separator 12 and the color difference and synchronous separator 14.

The delay correction signal generator 22 produces a delay control signal CTL, which is representative of the amount of delay between the luminance signal and color signal, and outputs the delay control signal CTL to the delay circuit 16. In accordance with the delay control signal CTL, the delay circuit 16 delays the luminance signal Y2, which is outputted by the color difference and synchronous separator 16, and outputs the delayed signal as luminance signal Y3. The delay circuit 16 is used to adjust the output time of the luminance signal Y3 in order to avoid the generation of a delay between the color difference signals R-Y and B-Y and a luminance signal Y4 which is output by the video signal processor 18.

The video signal processor 18, which inputs the luminance signal Y3 and the color difference signals R-Y and B-Y delayed by the delay circuit 16, processes the signals, and supplies the processed signals to a matrix 20 and to the delay correction signal generator 22, simultaneously. The video signal processor 18 functions to improve the characteristics of the video signals, compress the signals, and perform various other functions, which are well known in the art. The matrix 20 encodes the luminance signal Y4 and the color difference signals R-Y and B-Y, and provides the encoded signals to a CRT (e.g., cathode-ray tube) (not shown) for displaying images of the signals accordingly.

In operation, the delay correction signal generator 22 supplies the delay control signal CTL to the delay circuit 16. The generator 22 automatically detects the amount of delay between the luminance signal and the color signal, which has a delay as shown by FIG. 3(D) because of the processing in the Y/C separator 12, color difference and synchronous signals separator 14, delay circuit 16, the video signal processor 18, and so on. The delay correction signal generator 22 generates the control delay signal CTL corresponding to the detected delay amount, and supplies the generated signal CTL to the delay circuit 16. The operation of the delay correction signal generator 22 will be more fully described below with reference to FIG. 2.

Referring to FIG. 2, a luminance and color signals delay difference detector 26 operates during a period when a clock T2 outputted from a timing clock generator 14 is activated. The luminance and color signals delay difference detector 26 includes a unit delay circuit having various terminals connected in series with each other and operative to detect a delay between the luminance and color signals. The color signals R-Y and B-Y outputted from the video signal processor 18 are supplied to an initial input terminal of the detector 26. The delay difference is obtained by multiplying an output of each unit delay circuit by the color difference signal.

As explained previously, the timing clock generator 24 (as depicted in FIG. 2) receives the horizontal and vertical synchronous signals Hsync and Vsync, which are separated from the video signal in the color difference and synchronous signals separator 14, and generates the clock signal T2, which is used to detect the delay between the luminance signal Y2 and the color signal C. The timing clock generator 24 receives the horizontal and vertical synchronous signals Hsync and Vsync, and counts the number of the horizontal synchronous signal Hsync pulses from a rising edge or a falling edge of the vertical synchronous signal Vsync. In other words, the timing clock generator in response to the synchronous signals counts the horizontal synchronous signals received during the vertical retrace synchronous interval, and generates a clock pulse corresponding to the interval where the reference signal is inputted during the vertical retrace line interval. Based on the number of clock pulses counted, the clock signal T2 is generated in order to operate the luminance and color signals delay difference detector 26 only during one horizontal line of the vertical retrace line period.

A controller 28 inputs the delay difference detection signal generated by the luminance and color signals delay difference detector 26, and outputs the delay control signal CTL to the delay circuit 16 in order to adjust the delay amount of the delay circuit 16 and adjust the delay of the luminance signal accordingly.

Although the present invention has been shown and described with reference to a particular example of a circuit which adjusts the amount of delay of the luminance signal by the delay circuit 16, various other methods are also contemplated within the spirit and scope of the present invention. For example, a method of adjusting the delay of the color signal in a path where the color signal is processed, may be effected without departing from the spirit and scope of the invention. Moreover, while the present invention is described with reference to signals inputted to the luminance and color signal delay difference detector and the luminance signal Y, and the color difference signals R-Y and B-Y, it is readily apparent to one of ordinary skill in the relevant art that seen that the delay difference can be detected by using one luminance signal and one color signal (e.g., R-Y or B-Y).

Based on the foregoing detailed description of the present invention, the efficiency of producing video signal processing systems in products can be enhanced by automatically compensating for the delay between the luminance signal and the color signals regardless of the kind of video signals being processed.

While there have been illustrated and described what are considered to be preferred embodiments of the present invention, it will be understood by those skilled in the art that various changes and modifications may be made, and equivalents may be substituted for elements thereof, without departing from the true spirit and scope of the present invention. In addition, many modifications may be made to adapt a particular situation to the teaching of the present invention without departing from the central scope thereof. Therefore, it is intended that the present invention not be limited to the particular embodiment disclosed herein, but only by the claims which follow.

What is claimed is:

1. A circuit for automatically compensating for delay between a luminance signal and a color signal extracted from a composite video signal in a video signal processing system, said circuit comprising:

a timing clock generator, responsive to synchronous signals, and being operative to generate a timing signal based on said synchronous signals;

a luminance and color signals delay detector, responsive to a luminance signal and at least one color signal and to said timing signal, said luminance and color signals delay detector being operative to detect the delay between said luminance and at least one of said color signals, and outputting a detected delay signal;

a controller, coupled to said luminance and color signals delay detector to receive said detected delay signal, and being operative to generate a delay control signal; and a delay circuit, responsive to said delay control signal, for delaying said luminance signal based on said delay control signal, and outputting a delayed luminance signal, wherein the delay between said luminance signal and color signals is minimized.

2. The circuit as defined by claim 1, further comprising:

a Y/C separator, coupled to receive the composite video signal, and being operative to separate the composite video signal into said luminance signal and said color signal;

a color difference and synchronous signals separator, coupled to outputs of said Y/C separator to receive said luminance signal and color signal, said color difference and synchronous signals separator being operative to separate said color signals into color difference signals and producing said synchronous signals; and a video signal processor, coupled to an output of said color difference and synchronous signals separator to receive said color difference signals and to an output of said delay circuit to receive said delayed luminance signal, said video signal processor being operative to process said delayed luminance signal and color difference signals.

3. The circuit as defined by claim 1, wherein said timing clock generator is responsive to horizontal and vertical synchronous signals, and is operative to count said horizontal synchronous signals received during said vertical synchronous signals representative of a vertical retrace synchronous interval, so as to generate said timing signal.

4. A method for automatically compensating for delay between a luminance signal and a color signal extracted from a composite video signal in a video processing system, said method comprising the steps of:

separating a composite video signal into a luminance signal and color signal;

separating said color signals into color difference signals and producing synchronous signals;

delaying said luminance signal based on a delay control signal, and outputting a delayed luminance signal that has been delayed to correspond with said color signals;

processing said delayed luminance signal and color difference signals; and comparing said luminance signal with said color difference signals and detecting a delay therebetween, based on said synchronous signals, and generating said delay control signal based on the detected delay.

5. The method as defined by claim 4, wherein said composite video signal corresponds to a video signal where a reference signal is inputted during a vertical retrace line interval, and wherein said step of generating said delay control signal comprises the steps of:

generating a clock pulse corresponding to an interval where said composite video signal is inputted during said vertical retrace line interval;

detecting the delay between said luminance and color signals when said clock pulse is generated, and outputting a detected delay signal; and generating said delay control signal.

6. A video processing system including a circuit for automatically compensating for delay between a luminance signal and a color signal extracted from a composite video signal, said system comprising:

a Y/C separator, coupled to receive the composite video signal, and operative to separate the composite video signal into a luminance signal and color signals;

a color difference and synchronous signals separator, coupled to outputs of said Y/C separator to receive said luminance signal and color signal, said color difference and synchronous signals separator separating said color signals into color difference signals and producing synchronous signals;

a delay circuit, coupled to an output of said color difference and synchronous signals separator to receive said luminance signal and being responsive to a delay control signal, said delay circuit being operative to delay said luminance signal based on said delay control signal, and outputting a delayed luminance signal;

a video signal processor, coupled to an output of said color difference and synchronous signals separator to receive said color difference signals and to an output of said delay circuit to receive said delayed luminance signal, said video signal processor being operative to process said delayed luminance signal and color difference signals; and a delay correction signal generator, coupled to an output of said color difference synchronous and signals separator to receive said synchronous signals, and to an output of said video signal processor to receive luminance signal and color difference signals processed by said video signal processor, said delay correction signal generator being operative to compare said luminance signal with said color difference signals and to detect a delay therebetween, based on said synchronous signals, and to generate said delay control signal based on the detected delay.

7. The system as defined by claim 6, wherein said composite video signal corresponds to a video signal where a reference signal is inputted during a vertical retrace line interval.

8. The system as defined by claim 7, wherein said delay correction signal generator comprises:

a timing clock generator, responsive to said synchronous signals, and being operative to count said horizontal synchronous signals received during a vertical retrace synchronous interval, and generating a clock pulse corresponding to an interval where said reference signal is inputted during said vertical retrace line interval;

a luminance and color signals delay detector, responsive to said luminance signal and color difference signals output by said video signal processor and to said clock pulse generated by said timing clock generator, said luminance and color signals delay detector being operative to detect the delay between said luminance and color signals, and outputting a detected delay signal;

a controller, coupled to said luminance and color signals delay detector to receive said detected delay signal, and operative to generate said delay control signal and output said delay control signal to said delay circuit.

* * * * *